(12) United States Patent
Sviry et al.

(10) Patent No.: US 12,155,667 B2
(45) Date of Patent: Nov. 26, 2024

(54) TECHNIQUES FOR PROVIDING HYPERTEXT TRANSFER PROTOCOL THROUGH A SECURE ENVIRONMENT

(71) Applicant: HEWLETT PACKARD ENTERPRISE DEVELOPMENT LP, Spring, TX (US)

(72) Inventors: Guy Sviry, Tel Aviv (IL); Natan Elul, Tel Aviv (IL); Daniel Reisel, Tel Aviv (IL); Shay Shwartz, Tel Aviv (IL)

(73) Assignee: Hewlett Packard Enterprise Development LP, Spring, TX (US)

( * ) Notice: Subject to any disclaimer, the term of this patent is extended or adjusted under 35 U.S.C. 154(b) by 145 days.

(21) Appl. No.: 17/647,395

(22) Filed: Jan. 7, 2022

(65) Prior Publication Data
US 2023/0224302 A1    Jul. 13, 2023

(51) Int. Cl.
*H04L 9/40* (2022.01)
*H04L 67/02* (2022.01)

(52) U.S. Cl.
CPC .......... *H04L 63/102* (2013.01); *H04L 63/168* (2013.01); *H04L 67/02* (2013.01)

(58) Field of Classification Search
CPC .............................. H04L 63/102; H04L 67/02
See application file for complete search history.

(56) References Cited

U.S. PATENT DOCUMENTS

| | | | |
|---|---|---|---|
| 7,143,177 B1 | 11/2006 | Johnson et al. | |
| 7,412,533 B1 | 8/2008 | Johnson et al. | |
| 7,490,169 B1 | 2/2009 | Ogdon et al. | |
| 8,255,480 B2 | 8/2012 | Bedingfield et al. | |
| 8,825,756 B2 | 9/2014 | Katakawa | |
| 9,058,399 B2 | 6/2015 | Piernot | |
| 9,094,443 B1 | 7/2015 | Martini et al. | |
| 9,730,255 B1 | 8/2017 | Chu et al. | |
| 11,223,652 B1 | 1/2022 | Pierson et al. | |
| 2002/0133570 A1 | 9/2002 | Bartlett et al. | |
| 2003/0100320 A1* | 5/2003 | Ranjan | H04L 67/04 707/E17.115 |
| 2003/0149581 A1* | 8/2003 | Chaudhri | G06Q 30/06 705/26.1 |
| 2004/0049579 A1* | 3/2004 | Ims | H04L 67/564 709/225 |
| 2007/0124414 A1 | 5/2007 | Bedingfield et al. | |
| 2008/0263134 A1 | 10/2008 | Machida | |
| 2011/0191849 A1 | 8/2011 | Jayaraman et al. | |
| 2012/0030359 A1 | 2/2012 | Piernot | |

(Continued)

FOREIGN PATENT DOCUMENTS

| | | |
|---|---|---|
| CN | 110519656 A | 11/2019 |
| CN | 110602113 A | 12/2019 |

(Continued)

*Primary Examiner* — Matthew T Henning (57) ABSTRACT

In some examples, a system receives a request from a client device to access a web resource through a zero trust network environment, wherein the web resource is external to the zero trust network environment, the request including a first uniform resource locator (URL), and the web resource including a second URL; fetching the web resource based on the first URL; generating an alternate resource, the alternate resource including an alternate URL replacing the second URL; and providing the alternate resource to the client device.

20 Claims, 5 Drawing Sheets

(56) References Cited

U.S. PATENT DOCUMENTS

| | | |
|---|---|---|
| 2014/0259158 A1 | 9/2014 | Brown et al. |
| 2015/0039906 A1 | 2/2015 | Kolesnik |
| 2015/0135206 A1 | 5/2015 | Reisman |
| 2015/0135214 A1 | 5/2015 | Reisman |
| 2015/0370899 A1 | 12/2015 | Jung |
| 2018/0375745 A1 | 12/2018 | Balupari |
| 2020/0007502 A1* | 1/2020 | Everton ............... H04L 51/063 |
| 2020/0027128 A1 | 1/2020 | Strutton et al. |
| 2020/0045351 A1 | 2/2020 | Paixao |
| 2020/0266991 A1 | 8/2020 | Waters et al. |
| 2022/0286494 A1* | 9/2022 | Zheng ............... H04L 63/0281 |
| 2023/0224302 A1 | 7/2023 | Sviri et al. |

FOREIGN PATENT DOCUMENTS

| | | |
|---|---|---|
| CN | 107332856 B | 1/2021 |
| WO | 2012/073884 A1 | 6/2012 |

\* cited by examiner

```
<html>
<body>
<h1>WEB PAGE</h1>        — 310
<p>TEXT</p>              — 320
<a href="https://www.example.com/page1.html">LINK1</a>  — 330
<a href="https://www.example.com/page2.html">LINK2</a>  — 340
<a href="https://www.example.com/page3.html">LINK3</a>  — 350
</body>
</html>
```

TECHNIQUES FOR PROVIDING HYPERTEXT TRANSFER PROTOCOL THROUGH A SECURE ENVIRONMENT

TECHNICAL FIELD

The present disclosure relates generally to providing HTTP web pages through a secure network, and particularly to providing HTTP web pages through a zero trust secure environment.

BACKGROUND

In the past, workers using computer devices would have to come into an office building, where they were assigned a designated computer device, on which they could complete their tasks, be they data entry, writing code, or programming complex microelectronics simulations.

Today, however, increasingly employees are finding increased productivity by working anywhere, e.g., on the go in between meetings, at airports, at a location of a client of the employer, whom the employee is currently servicing, and the like. This flexibility is something employees enjoy, while employers benefit.

This work approach is, by definition, much less secure. While a single office building (location) can be easily managed to direct all communication going in and out, when a first employee wants to access company data from a public hotspot, while another is accessing the same data from within the company, cybersecurity challenges naturally arise.

Add to this the fact that users have a preference to work on their own devices, which means that a company no longer has full IT ownership of the devices. An employee may neglect to update software on their device or may have the device stolen.

One strategic approach to solve some of these security issues is known as implementing a zero trust environment. In a zero trust environment there is no implicit trust of user accounts or devices. The most secure network environment would not allow a user to take any action within the network, but such an environment would be useless as nothing can be gained from having an environment which permits no action. On the other hand, a permissive environment would be fraught with security risks and practically invite attackers to try their hand at gaining an advantage. Therefore, when implementing a zero trust environment, a balance should be sought between security and usability.

For example, a user may wish to use their mobile device, such as a laptop or cellular phone, to connect to a machine on their employer's network. While connected to that machine, the user may want or need to access the internet. It would be a risk to allow the user to have complete internet access, and it would be impractical to bar access altogether.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for providing web resources through a zero trust network environment. The method comprises: receiving a request from a client device to access a web resource through a zero trust network environment, wherein the web resource is external to the zero trust network environment, the request including a first uniform resource locator (URL), and the resource further including a second URL; fetching the web resource based on the first URL; generating an alternate resource, the alternate resource including an alternate URL replacing the second URL; and providing the alternate resource to the client device.

Certain embodiments disclosed herein also include a non-transitory computer readable medium being stored thereon causing a processing circuitry to execute a process, the process comprising: receiving a request from a client device to access a web resource through a zero trust network environment, wherein the web resource is external to the zero trust network environment, the request including a first uniform resource locator (URL), and the resource further including a second URL; fetching the web resource based on the first URL; generating an alternate resource, the alternate resource including an alternate URL replacing the second URL; and providing the alternate resource to the client device.

Certain embodiments disclosed herein also include a system for providing web resources through a zero trust network environment. The system comprises: a processing circuitry; and a memory, the memory containing instructions that, when executed by the processing circuitry, configure the system to: receive a request from a client device to access a web resource through a zero trust network environment, wherein the web resource is external to the zero trust network environment, the request including a first uniform resource locator (URL), and the resource further including a second URL; fetch the web resource based on the first URL; generate an alternate resource, the alternate resource including an alternate URL replacing the second URL; and provide the alternate resource to the client device.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

A zero trust network environment is a secure compute environment in which a user device can access when providing access credentials. The zero trust network environment may be accessed from a client device through a web browser application. Once authorized, the client device may request web resources using uniform resource locators (URLs). A web resource may be an HTML page. The web resource may include a second URL therein. A frontend server of the zero trust network may be configured to fetch the web resource based on a first URL, and then generate an alternate resource. The alternate resource includes an alternate URL which is generated to replace the second URL. The alternate URL may be directed to a host associated with the zero trust network environment, thus keeping the browsing session confined to the zero trust network environment.

Figure 1:
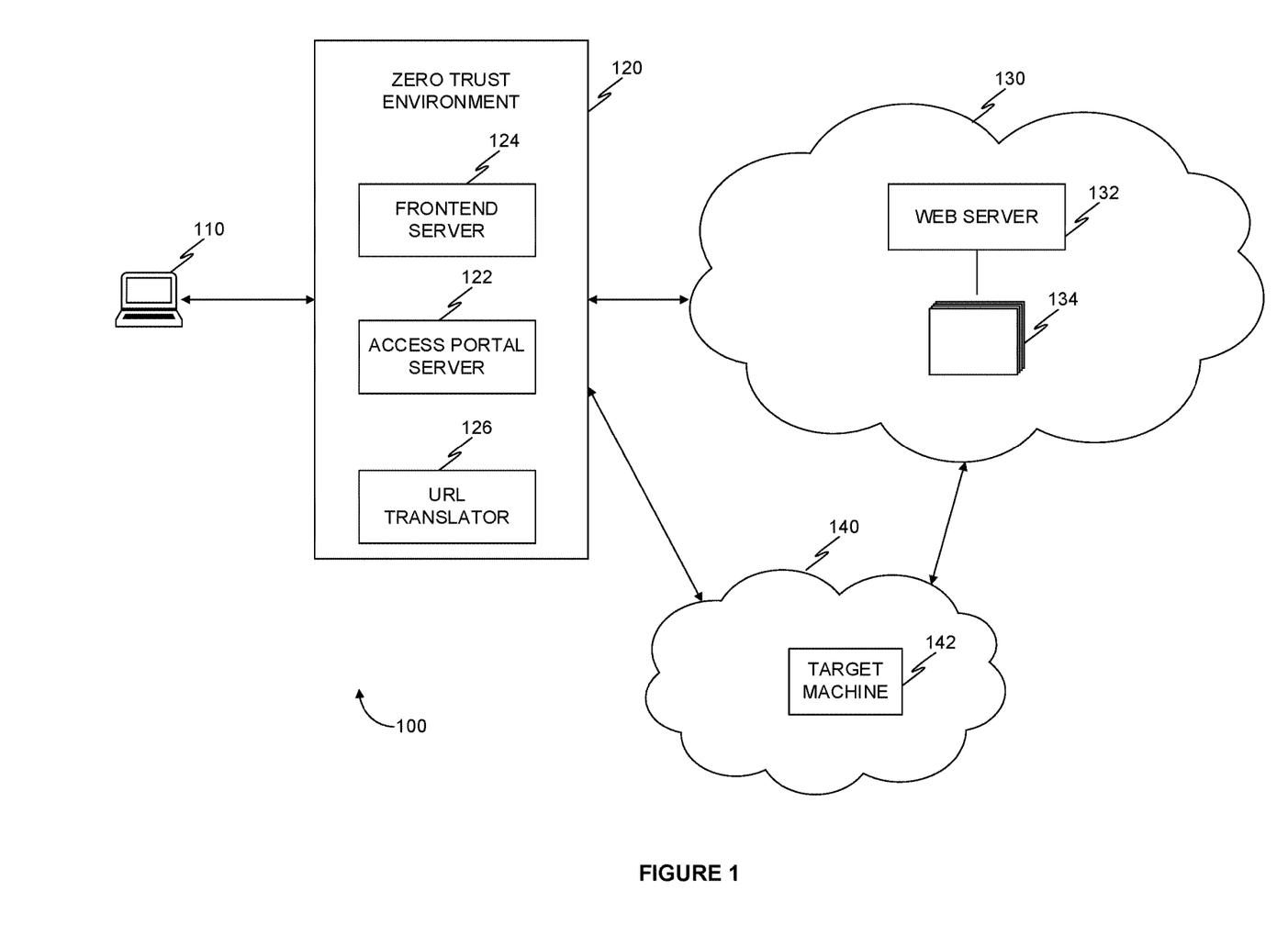
FIG. 1 is a network diagram in which a zero trust environment is utilized to provide a secure connection which allows access to web resources in a secure manner, implemented in accordance with an embodiment.

FIG. 1 is an example of a network diagram 100 in which a zero trust environment is utilized to provide a secure connection which allows to access web resources in a secure manner, implemented in accordance with an embodiment.

A client device 110 connects to a zero trust environment 120. The client device 110 may be for example a mobile phone, a laptop computer, personal computer, tablet, and the like. The zero trust environment is a networked computing environment, and may be implemented for example in a cloud computing environment. For example, the zero trust environment 120 may be implemented as a virtual private cloud (VPC) in an Amazon® Web Service (AWS) environment. The zero trust environment 120 includes therein a frontend server 124, an access portal server 122, and a URL (uniform resource locator) translator 126, each of which may be implemented as one or more workloads in the zero trust environment 120. A workload may be, for example, a serverless function, a container cluster, or a virtual machine. For example, the access portal server 122 may be implemented as a virtual machine utilizing Oracle® VirtualBox™. The frontend server 124 may be implemented as an application on a node in a Kubernetes™ cluster. In an embodiment, a plurality of frontend servers may be implemented. A URL translator 126 may be implemented as a Lambda™ serverless function in AWS.

In an embodiment, the client device 110 connects to the zero trust environment 120 over a network (not shown). The network may be, but is not limited to, a wireless, cellular or wired network, a local area network (LAN), a wide area network (WAN), a metro area network (MAN), the Internet, the worldwide web (WWW), similar networks, and any combination thereof. Connecting to the zero trust environment 120 may include establishing a connection with the access portal server 122, the frontend server 124, and any combination thereof.

For example, a client device 110 may send a request to connect to the access portal server 122. The access portal server 122 may send the client device 110 instructions for rendering an interface, through which the client device 110 sends the access portal server 122 login credentials. Login credentials may be, for example, a username, password, secret, token, certificate, and any combination thereof. In an embodiment the access portal server 122 may utilize an identity and access management (IAM) service (not shown) in order to authenticate a user account, user device, or combination of both.

In response to successfully authenticating the client device 110, the client device 110 is permitted to connect with the frontend server 124. The frontend server 124 may be implemented as a proxy server. In an embodiment, the frontend server 124 may establish a connection with a secure network environment 140. The secure network environment 140 may also be implemented on a cloud computing infrastructure, for example as a VPC on Google® Cloud Platform (GCP). The secure network environment 140 may include a plurality of machines, such as a target machine 142. The target machine 142 may be implemented as a virtual machine, a node in a container cluster, and the like.

In an embodiment, the frontend server 124 may connect with a backend server (not shown), which in turn connects to a connector (not shown), implemented in the secure network environment. The connector may provide communication between workloads (machines) implemented in the secure network environment 140 and a backend server, the backend server implemented in the zero trust environment 120.

The client device 110 may initiate a request to receive a resource from a public network environment 130, such as the Internet. For example, the client device 110 may initiate a request to receive a plurality of web pages 134 from a web server 132, by sending a request over hypertext transfer protocol (HTTP). A resource may be a web page, image, multimedia file, text file, script, and the like.

In an embodiment, the client device 110 may connect with the target machine 142, for example utilizing Secure Shell (SSH) or Remote Desktop Protocol (RDP). The client device 110 may then initiate a request on behalf of the target machine 142, which causes the target machine 142 to access the web server 132. Alternatively, the client device 110 may attempt to request a resource from the web server 132 on behalf of itself (and not the target machine 142). In either embodiment, there may be a security concern with allowing the client device 110 to make such a request.

For example, spyware, adware and other types of malware may infect the client device 110 or the target machine 142 (in an embodiment where the client device 110 at least partially controls or accesses the target machine 142) if allowed unfettered access to public networks. In some embodiments, a policy may be enforced to allow or block certain types of network traffic, for example based on geolocation, IP address, domain name, and the like. The policy may be generated and stored in a policy engine (not shown) in the zero trust environment 120.

When receiving a URL request, the frontend server 124 may fetch the resource, and provide the resource to the URL translator 126. The URL translator 126 may receive a resource, scan the resource for additional URLs, replace at least a portion of the URLs with alternate URLs, and generate an alternate resource, which is sent to the client device in place of the original resource. Thus, the user of the client device 110 is able to experience web browsing, while potentially malicious or unapproved resources may be blocked. Rewriting the URLs allows to replace external URLs with internal, approved, URLs, thereby decreasing the security risk posed by external resources.

In certain embodiments, external URLs are rewritten to a domain associated with the zero trust environment 120. An external URL is a URL directed to a domain which is not associated with the zero trust environment 120, while an internal URL is a URL which is associated with the zero trust environment 120. This allows a web browsing session to remain secure and confined to the zero trust environment 120, which can, for example, apply traffic policies on the web traffic, while appearing seamless to the user.

Figure 2:
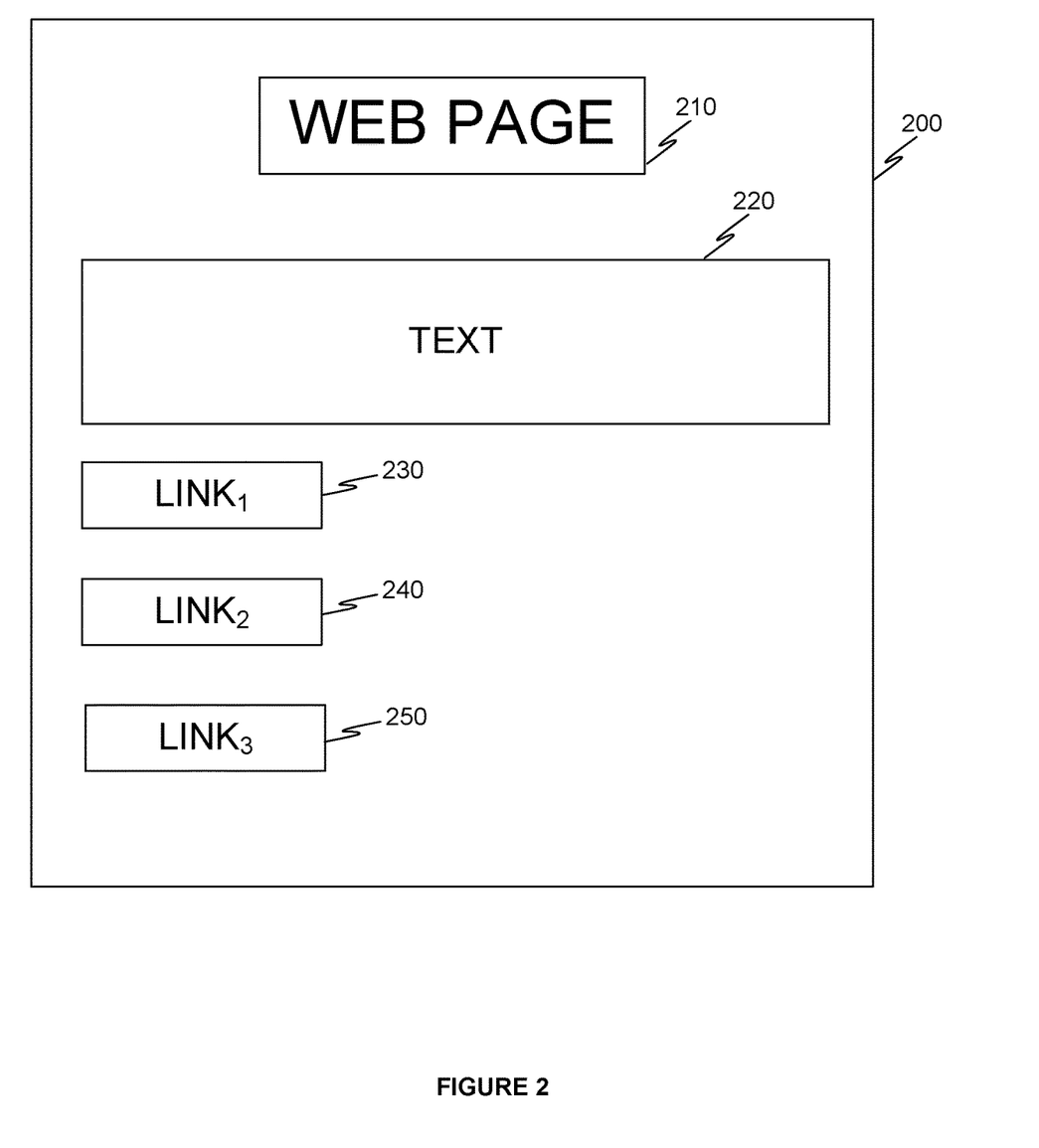
FIG. 2 is a schematic illustration of a web page, implemented in accordance with an embodiment.

FIG. 2 is an example schematic illustration of a web page 200, implemented in accordance with an embodiment. A web page is a type of resource which may be accessed utilizing HTTP, or similar protocols. A web page may be represented as visualization, such as in this figure. The web page 200 includes a title 210, also known as a header, a text section 220, a first link 230, a second link 240, and a third link 250. A link is a section on the web page 200 which, when interacted with (i.e., clicked on), instructs a web browser to fetch a resource from a URL associated with the link (also called a hyperlink). Hyperlinks may appear by themselves, or as part of a text. Hyperlinks may be associated with multimedia, images, texts, and the like, which are presented as part of the web page.

Figure 3:
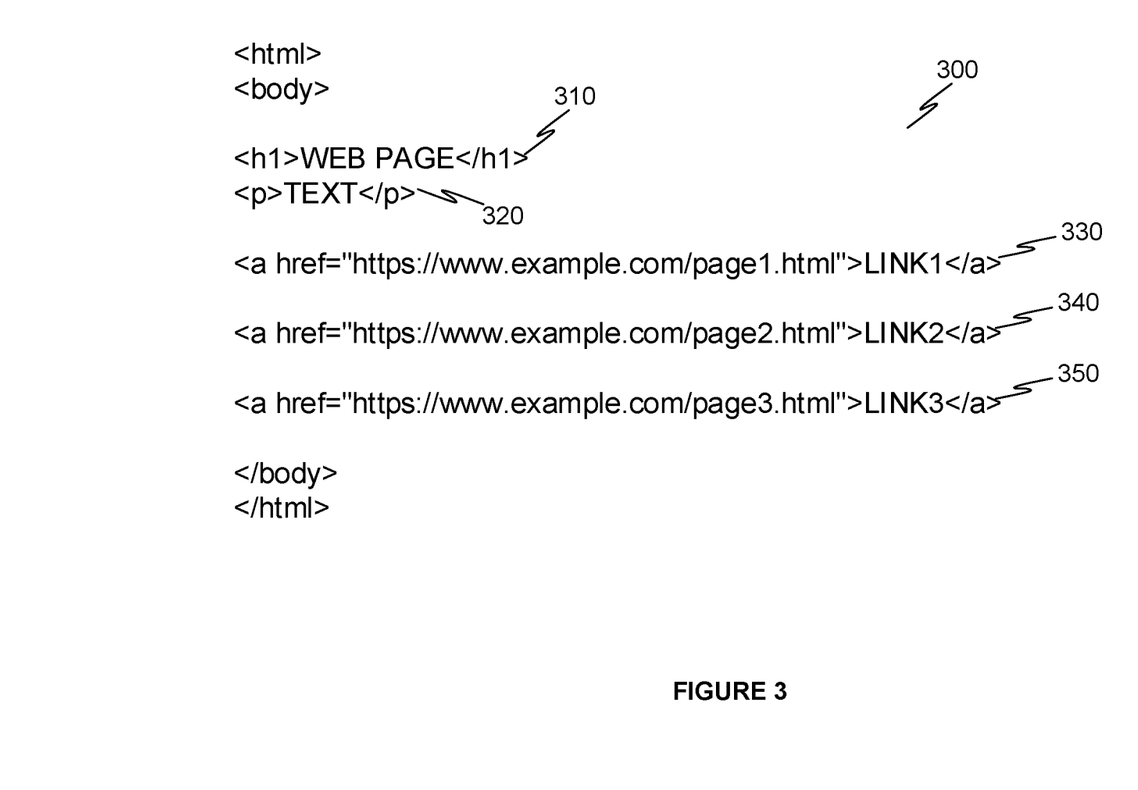
FIG. 3 is a code representation of a web page, implemented in accordance with an embodiment.

FIG. 3 is an example of a code representation 300 of a web page, implemented in accordance with an embodiment. A web page 300 may be represented as HTML (hypertext markup language) script, which when received by a web browser configures the web browser to render the web page according to the script. For example, the header 210 of FIG. 2 is represented by code line 310. In HTML script, text placed between a <h1> and a </h1> marker will be rendered by a web browser as a header.

The web browser may have predefined rules for how a header should be rendered, including font type, font size, font attributes (such as bold, italics, underline, etc.), color and the like. The first link 230 of FIG. 2 is represented by code line 330 in FIG. 3. In this embodiment, the link in code line 330 is for a domain "www.example.com." A URL translator may be defined to translate the "www.example.com" domain to an alternate URL from "examplecom.securenetwork.com," where securenetwork.com is a domain associated with a zero trust network. When a user clicks on the hyperlink which represents code line 330, rather than fetching a resource from example.com, the web browser is directed to fetch a resource from examplecom.securenetwork.com, which is an alternate URL directed to the zero trust network, thus resulting in the browsing session remaining within the zero trust network environment. For example, a frontend server may receive the request, translate the alternate URL to an original URL, fetch the resource, perform a rewrite (if necessary) and send the rewritten resource to the client device. Thus, the web session of the client device is confined to the secure connection with the zero trust network. However, if the user device would direct their browser to www.example.com, the web session would not be secured by the zero trust environment, since the traffic would not be routed through it.

In an embodiment, the URL translator may store a translation table, or alternatively use a translation policy to translate the alternate URL to an original URL. The frontend server 124 may then fetch a resource from the original URL and present it to the client device 110. This method is described in more detail in FIG. 4 below.

Figure 4:
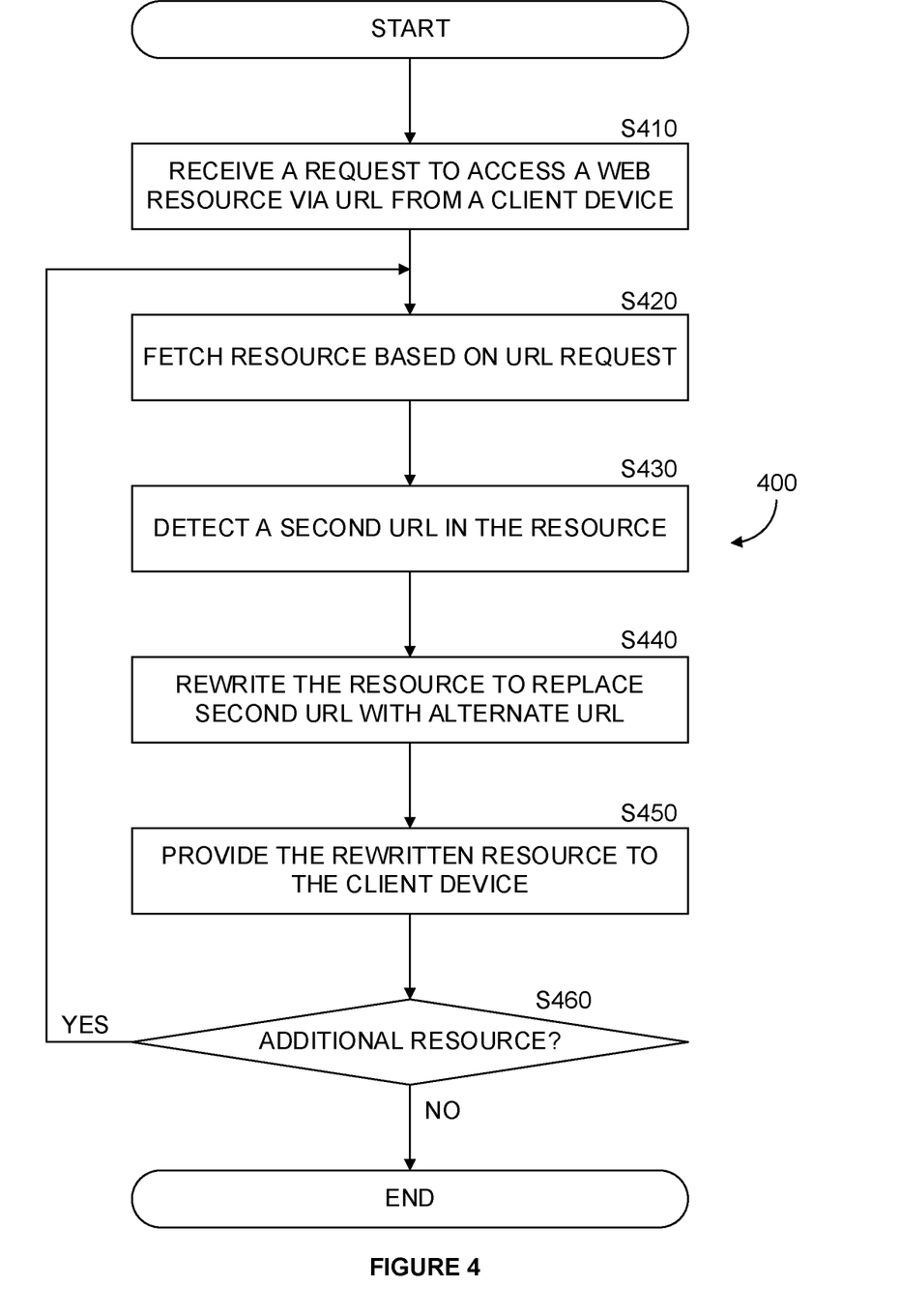
FIG. 4 is a flowchart of a method for rewriting URLs delivered through a zero trust environment, implemented in accordance with an embodiment.

FIG. 4 is an example flowchart 400 of a method for rewriting URLs delivered through a zero trust environment, implemented in accordance with an embodiment.

At S410, a request is received to access a web resource. The request may originate from a client device (also known as a user device). The client device may be, but is not limited to, a personal computer, a laptop, a tablet computer, a smartphone, a wearable computing device, or any other device capable of receiving and displaying web resources. The request may include a resource locator, such as a URL, which indicates a network address and a resource which should be fetched from the network address.

At S420, the web resource is fetched, based on the URL request. In an embodiment, a URL translator may determine if the URL is associated with a zero trust network environment (i.e. internal URL), or if it is external to the zero trust network environment (i.e., a domain not associated with the zero trust network environment). If the URL is internal to the zero trust network environment, the URL translator may translate the URL to an external URL. In the example discussed in FIG. 3 above, if the client device requests a resource from a URL designated as examplecom.securenetwork.com, the URL translator can detect that this is an internal URL associated with the zero trust network environment and translate it to the external URL by substituting the domain to example.com. The frontend server may then fetch the resource from the external URL.

At S430 a second URL is detected in the resource. In an embodiment, a plurality of second URLs may be detected. The second URL may be detected by a URL translator, which is configured, for example, to scan HTML scripts for tags indicating a URL (a href tag).

At S440, an alternate resource is generated by rewriting the fetched resource with an alternate URL, which replaces the second URL. In an embodiment, the alternate URL is for a domain associated with the zero trust network environment. In certain embodiments where a plurality of second URLs are detected, an alternate URL may be generated for each, for example by a URL translator. In some embodiments, a translation table may be used to store pairs of original and alternate URLs. In certain embodiments, the URL translator may utilize policies, including heuristics, to determine how to generate an alternate URL. Thus, an alternate URL can be converted back to an original URL by using the same (or complementary) policy or heuristic used to convert the original URL to the alternate URL.

At S450, the alternate resource is provided. The alternate resource may be provided to the client device which requested the original resource. An alternate resource may be an HTML script which was scanned for external URLs, each of which was replaced with an alternate URL which directs to an internal URL, associated with a zero trust network environment.

At S460, a check is performed to determine if another resource is requested. For example, a client device may request a plurality of resources, such as any of: a web page, an image, text file, multimedia file, and the like. If another resource is requested execution may continue a S420, otherwise execution may terminate. Requests for resources may be stored in a queue, for example of a frontend server.

It should be appreciated that rewriting domains (or other host indicators) to a domain associated with the zero trust network environment allows all traffic to pass through the zero trust network environment, thus permitting the frontend server for example to apply policies to the traffic. The rewriting domains method also allows to monitor network traffic from the client device, once a secure web session is established with the zero trust network environment. Without rewriting domains, a client device may request a resource from a domain outside of the zero trust environment, which the zero trust environment would not be able to monitor, since the request would not pass through it. It is therefore more secure to have network traffic pass through the zero trust network environment.

Figure 5:
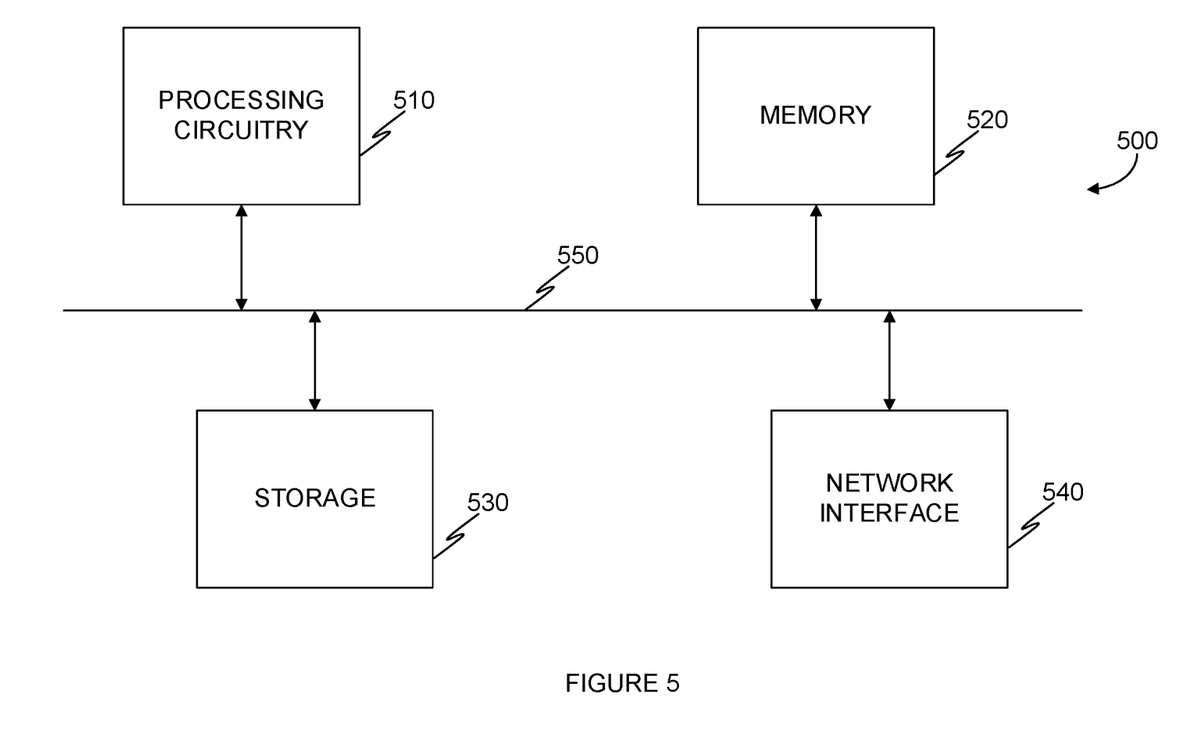
FIG. 5 is a schematic diagram of a URL translator 500 implemented according to an embodiment.

FIG. 5 is an example schematic diagram of a URL translator 500 implemented according to an embodiment. The URL translator 500 includes a processing circuitry 510 coupled to a memory 520, a storage 530, and a network interface 540. In an embodiment, the components of the URL translator 500 may be communicatively connected via a bus 550. In certain embodiments, a frontend server 124 and URL translator 126 may be implemented as a single machine, i.e., URL translator 500.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, or any other medium which can be used to store the desired information.

The network interface 540 allows the URL translator 500 to communicate with, for example, a frontend server 124 of FIG. 1.

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method comprising:
   receiving, at a server comprising a hardware processor, a first request from a client device to access a web resource through a zero trust network environment, wherein the web resource is external to the zero trust network environment, the first request including a first uniform resource locator (URL), and the web resource including a second URL;
   fetching, by the server, the web resource based on the first URL;
   generating, by the server, an alternate resource, the alternate resource including an alternate URL translated from and replacing the second URL;
   providing, by the server, the alternate resource to the client device;
   receiving, at the server from the client device, a second request to access a further web resource, the second request including the alternate URL;
   obtaining, by the server, the second URL based on a translation of the alternate URL in the second request to the second URL;

fetching, by the server, the further web resource using the second URL; and applying, by the server, a security policy to determine whether to block the further web resource.

2. The method of claim 1, wherein the alternate URL is associated with a domain of the zero trust network environment.

3. The method of claim 2, wherein the first URL is associated with a domain which is not of the zero trust network environment.

4. The method of claim 2, further comprising:
determining, by the server, whether the alternate URL in the second request is associated with the domain of the zero trust network environment; and
translating the alternate URL to the second URL based on determining that the alternate URL in the second request is associated with the domain of the zero trust network environment.

5. The method of claim 1, wherein the web resource is a hypertext markup language (HTML) document.

6. The method of claim 1, further comprising:
storing the alternate URL with the second URL in a translation table,
wherein the translation of the second URL in the web resource to the alternate URL uses the translation table, and
wherein the translation of the alternate URL in the second request to the second URL uses the translation table.

7. The method of claim 1, further comprising:
based on determining from applying the security policy that the further web resource is not blocked, providing the further web resource to the client device.

8. The method of claim 7, further comprising:
generating, by the server, a second alternate resource based on replacing a third URL in the further web resource with a second alternate URL
providing the second alternate resource from the server to the client device.

9. The method of claim 1, wherein the zero trust network environment is a cloud computing environment which requires a user to provide login credentials in order to access a resource in the zero trust network environment.

10. A non-transitory computer readable medium comprising instructions that upon execution cause a system to:
receive, at the system, a first request from a client device to access a web resource through a zero trust network environment, wherein the web resource is external to the zero trust network environment, the first request including a first uniform resource locator (URL), and the web resource including a second URL;
fetch the web resource based on the first URL;
generate an alternate resource, the alternate resource including an alternate URL translated from and replacing the second URL;
provide the alternate resource from the system to the client device;
receive, at the system from the client device, a second request to access a further web resource, the second request including the alternate URL;
obtain the second URL based on a translation of the alternate URL in the second request to the second URL;
fetch the further web resource using the second URL;
apply, at the system, a security policy to determine whether to block the further web resource.

11. The non-transitory computer readable medium of claim 10, wherein the alternate URL is associated with a domain of the zero trust network environment, and the instructions upon execution cause the system to:
determine whether the alternate URL in the second request is associated with the domain of the zero trust network environment; and
translate the alternate URL to the second URL based on determining that the alternate URL in the second request is associated with the domain of the zero trust network environment.

12. A system comprising:
a processor; and
a non-transitory storage medium storing instructions executable on the processor to:
receive, at the system, a first request from a client device to access a web resource through a zero trust network environment, wherein the web resource is external to the zero trust network environment, the first request including a first uniform resource locator (URL), and the web resource including a second URL;
fetch the web resource based on the first URL;
generate an alternate resource, the alternate resource including an alternate URL translated from and replacing the second URL;
provide the alternate resource from the system to the client device;
receive, at the system from the client device, a second request to access a further web resource, the second request including the alternate URL;
obtain the second URL based on a translation of the alternate URL in the second request to the second URL;
fetch the further web resource using the second URL; and
apply, at the system, a security policy to determine whether to block the further web resource.

13. The system of claim 12, wherein the alternate URL is associated with a domain of the zero trust network environment.

14. The system of claim 13, wherein the first URL is associated with a domain which is not of the zero trust network environment.

15. The system of claim 13, wherein the instructions are executable on the processor to:
determine whether the alternate URL in the second request is associated with the domain of the zero trust network environment; and
translate the alternate URL to the second URL based on determining that the alternate URL in the second request is associated with the domain of the zero trust network environment.

16. The system of claim 15, wherein the instructions are executable on the processor to:
generate a second alternate resource based on replacing a third URL in the further web resource with a second alternate URL; and
provide the second alternate resource from the system to the client device.

17. The system of claim 12, wherein the web resource is a hypertext markup language (HTML) document.

18. The system of claim 12, wherein the instructions are executable on the processor to:
store the alternate URL with the second URL in a translation table,
wherein the translation of the second URL in the web resource to the alternate URL uses the translation table, and wherein the translation of the alternate URL in the second request to the second URL uses the translation table.

19. The system of claim 12, wherein the instructions are executable on the processor to:
based on determining from applying the security policy that the further web resource is not blocked, provide the further web resource from the system to the client device.

20. The system of claim 12, wherein the zero trust network environment is a cloud computing environment which requires a user to provide login credentials in order to access a resource in the zero trust network environment.

\* \* \* \* \*